Patented June 6, 1933

1,912,626

UNITED STATES PATENT OFFICE

FRANZ DREXLER, OF LUDWIGSHAFEN-ON-THE-RHINE, AND EMMERICH v. PONGRATZ, OF OPPAU, GERMANY, ASSIGNORS TO I. G. FARBENINDUSTRIE AKTIENGESELLSCHAFT, OF FRANKFORT-ON-THE-MAIN, GERMANY

WATERPROOF BUILDING MATERIAL

No Drawing. Application filed August 21, 1931, Serial No. 558,638, and in Germany September 19, 1930.

The present invention relates to the production of waterproof building materials.

A great variety of additional materials, as for example soaps, oils, fats, waxes, paraffin waxes or yeast decomposed by means of alkalies, has already been proposed for the preparation of building materials which will repel water or which are impermeable to water, such as mortar, concrete or structures from gypsum or Sorel cement. Tar or bitumen has also been added to these building materials, if desired in conjunction with crude or neutralized acid sludge from refining mineral oils. There are many objections to these agents, however. In part they injuriously affect the setting process of cement, and in part they effect a reduction of the compressive strength of the building materials. In the case of many of the additional materials it is moreover necessary to add such large amounts of water-repelling agents to the concrete and the like that the cost of the building is considerably increased.

We have now found that valuable building materials which are repellant and impermeable to water are obtained by adding to the mixture of binder, filler and water necessary for the production of the building materials during their preparation the water-insoluble organic residues of acid sludges, i. e. of acid sludge or of acid tar obtained in the refining of mineral and tar oils by means of concentrated sulphuric acid. The said residues are obtained by removing the sulphuric acid completely or almost completely by washing with water and may be employed as such in the wet state or in the form of the product obtained by the addition of alkalies or alkaline earths, such as caustic potash or soda, sodium carbonate, calcium oxide, hydroxide or carbonate.

The amount of the said water-insoluble organic residues necessary for rendering mortar, concrete and the like waterproof is generally only from about 0.1 to about 1.5 per cent of the weight of the binder such as lime or hydraulic cement, from 0.2 to 0.8 or 1 per cent being sufficient in most cases, and this is far less than that of the waterproofing agents hitherto used. Furthermore, the cost of the said materials is only a fraction of the cost of the waterproofing agents hitherto generally employed in practice because it is a waste product from the refining of crude mineral and tar oils. Besides this, better results are obtained with the said water-insoluble substances than with the water-soluble and usually strongly acid crude acid sludges hitherto employed.

The water-insoluble organic residues are added, preferably suspended or emulsified in water or dissolved in aqueous alkaline solutions if the neutralization products obtained by treatment with alkalies or alkaline earths are to be employed, before or during the preparation of the mortar or concrete, preferably together with the water necessary for the preparation of the mortar or concrete. In many cases it is preferable to employ the said products together with other substances suitable for waterproofing building materials, such as salts, as for example aluminum sulphate, or paraffin waxes and the like and/or with germicides, such as water-soluble salts of hydrofluoric or fluorsilicic acids as for example alkali metal salts which prevent the growth of fungi in the residues on storage. These salts are generally employed in quantities from about 0.2 to 5 per cent, usually from 0.2 to 1 per cent, by weight of the wet residues or the neutralized wet residues.

In some cases, especially with the acid tars from refining mineral oils, it is advantageous first to remove from the crude acid tar a part of the organic substances by dilution with water, leading in steam, concentrating, and then removing by filtration or centrifuging the separated coked organic substances; the concentrated solution, usually called "restored acid", which still contains a substantial quantity of organic compounds is then separated by dilution with water and subsequent filtration or centrifuging, whereby the solid organic substances are recovered. These organic substances, freed from the main portion of sulphuric acid, are then suitable for the purposes of the present invention as such or after neutralization as a waterproofing agent. The aforesaid cooking operation may be carried out simultaneously with the concentration for example in towers provided with heat- and acid-resisting fillers, preferably of ceramic material, whereby a simultaneous filtration may be performed.

Particularly valuable agents are the water-insoluble organic residues from refining coal distillates with sulphuric acid, as for example the acid sludges obtained in refining crude benzol or solvent naphtha or similar liquid distillates from the carbonization of bituminous coal.

The following examples will further illustrate the nature of this invention, but the invention is not restricted to these examples. The parts are by weight.

*Example 1*

A mixture of 100 parts of a Portland cement, 500 parts of sand and gravel and 110 parts of water to which has been added 0.6 part of the water-insoluble organic residue obtained from a benzine acid sludge by dilution with water yields, after the usual working up into concrete and hardening, a product the absorbent power of which for water amounts to only a fraction of that of a concrete prepared without the addition of the said residue.

*Example 2*

A mixture of 100 parts of blast furnace cement, 300 parts of sand and gravel and 70 parts of water to which has been added 1 part of a product obtained by neutralizing with lime the organic substances separated from so-called "restored-acids" by dilution and centrifuging yields, after the usual working up and subsequent setting, a concrete which remains waterproof even under high pressures of water.

*Example 3*

100 parts of Portland cement are mixed with 400 parts of sand and gravel. The water necessary therefor (90 parts) is stirred with 0.8 part of a sludgy organic substance separated as the heavier component from American benzine acid tar by dilution with water, leading in steam, separating coked matter, concentrating, and centrifuging after repeated dilution with water. The mixture is worked up in the usual manner and after setting yields a product which is waterproof even under high-pressure of water.

Instead of the said sludgy substance it is advantageous by reason of the lower cost, to employ the water-insoluble fraction of the waste product obtained by the acid purification of crude benzol from coke oven processes by means of sulphuric acid.

*Example 4*

Water is added in the ratio of 1:1.6 to an acid tar obtained by the refining of coke oven benzol with the aid of sulphuric acid, whereby the greater part of the organic substances is precipitated. This is added as such or after mixing with basic substances such as lime (in order to deacidify the substance and to remove the smell of sulphur dioxide) in an amount of 0.8 part to the water necessary (80 parts) for a mixture of 100 parts of cement and 300 parts of sand and gravel. After working up into concrete in the usual manner and setting a particularly waterproof product is obtained. If desired, the acid tar may be incorporated with 0.5 per cent of its weight of sodium fluoride, which addition proves valuable if the acid tar be stored for some time in the wet state.

*Example 5*

An acid tar obtained in refining crude benzol with the aid of sulphuric acid is diluted with 1.3 times its volume of water and the organic matter separating out is recovered and freed from sulphuric acid by filter pressing. By washing with water remainders of sulphuric acid are removed, the last traces thereof being neutralized with caustic lime. From 0.3 to 0.5 per cent by weight of the resulting product are added to water necessary for making concrete from 100 parts of cement and 500 parts of gravel. The concrete obtained is waterproof and possesses a compressive strength which is after 7 days about 10 per cent higher than that of a concrete prepared without the said addition of the acid tar product, the setting being not held back. In many cases quantities of from 0.1 to 0.3 per cent of the acid tar product are sufficient for the production of a concrete which is waterproof even at a high pressure of water.

What we claim is:—

1. As a new article of manufacture, a waterproof building material comprising a hydraulic cement and from 0.3 to 1 per cent of its weight, of a water-insoluble organic residue of benzol acid sludge free from water-soluble matter.

2. As a new article of manufacture, a waterproof building material comprising a hydraulic cement and from 0.3 to 1 per cent, of its weight, of a neutralized water-insoluble organic residue of benzol acid sludge free from water-soluble matter.

3. As a new article of manufacture, a waterproof building material comprising a hydraulic cement and from 0.3 to 1 per cent, of its weight, of a water-insoluble organic residue of an acid sludge from refining coal distillates with sulphuric acid.

In testimony whereof we have hereunto set our hands.

FRANZ DREXLER.
EMMERICH v. PONGRATZ.